US011526435B2

(12) United States Patent
Muthiah (10) Patent No.: US 11,526,435 B2
(45) Date of Patent: Dec. 13, 2022

(54) STORAGE SYSTEM AND METHOD FOR AUTOMATIC DATA PHASING

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 20 days.

(21) Appl. No.: 16/781,688

(22) Filed: Feb. 4, 2020

(65) Prior Publication Data

US 2021/0240612 A1 Aug. 5, 2021

(51) Int. Cl.
*G06F 12/00* (2006.01)
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01)

(58) Field of Classification Search
CPC ............ G06F 12/0253; G06F 12/10; G06F 2212/1044; G06F 2212/1036; G06F 2212/7201; G06F 12/0246; G06F 2212/7205; G06F 2212/7208
See application file for complete search history.

(56) References Cited

U.S. PATENT DOCUMENTS

| | | | |
|---|---|---|---|
| 6,002,802 A | 12/1999 | Chujoh | |
| 6,768,661 B2 | 7/2004 | Vyvoda et al. | |
| 7,847,820 B2 | 12/2010 | Vallone et al. | |
| 8,516,019 B2 | 8/2013 | Hunt et al. | |
| 8,676,027 B2 | 3/2014 | Hugosson | |
| 8,725,940 B2 | 5/2014 | Grube et al. | |
| 8,825,721 B2 | 9/2014 | Hunt et al. | |
| 10,007,442 B2 | 6/2018 | Hahn et al. | |
| 10,095,445 B2 | 10/2018 | De et al. | |
| 10,228,854 B2 | 3/2019 | Romanovsky et al. | |
| 2001/0044856 A1 | 11/2001 | Agesen et al. | |
| 2003/0093801 A1 | 5/2003 | Lin | |
| 2003/0225746 A1* | 12/2003 | Braun | G06F 16/24568 |
| 2006/0190419 A1 | 8/2006 | Bunn et al. | |
| 2008/0310736 A1 | 12/2008 | Chattopadhyay | |

(Continued)

FOREIGN PATENT DOCUMENTS

EP  2 141 928 A1  1/2010
JP  2010-161740 A  7/2010

(Continued)

OTHER PUBLICATIONS https://dl.acm.org/doi/fullHtml/10.1145/3310361 ACM Trans. Comput. Syst., vol. 36, No. 1, Article 3, Publication date: Mar. 2019. DOI: https://doi.org/10.1145/3310361 (Year: 2019).*

(Continued)

*Primary Examiner* — Gurtej Bansal
(74) *Attorney, Agent, or Firm* — Crowell & Moring LLP (57) ABSTRACT

A storage system and method for automatic data phasing are disclosed. In one embodiment, a storage system is configured to receive, from a host, data to be written in the memory and an indication of an expected lifespan of the data; and determine whether to perform a garbage collection operation on the data based on the expected lifespan of the data. Other embodiments are provided.

20 Claims, 5 Drawing Sheets

(56) References Cited

U.S. PATENT DOCUMENTS

| | | | |
|---|---|---|---|
| 2009/0319255 | A1 | 12/2009 | Vengerov |
| 2010/0074594 | A1 | 3/2010 | Nakamura |
| 2010/0272411 | A1 | 10/2010 | Shiitani et al. |
| 2010/0284612 | A1 | 11/2010 | Peters |
| 2011/0258375 | A1* | 10/2011 | Khosrowpour ......... G06F 16/90 711/108 |
| 2012/0082209 | A1 | 4/2012 | Li |
| 2012/0102297 | A1* | 4/2012 | Haines ................ G06F 3/064 711/209 |
| 2012/0210232 | A1 | 8/2012 | Wang |
| 2013/0254611 | A1 | 9/2013 | Amerga et al. |
| 2014/0075096 | A1* | 3/2014 | Tanaka ............... G06F 12/0246 711/103 |
| 2015/0012671 | A1 | 1/2015 | Park et al. |
| 2015/0237351 | A1 | 8/2015 | Lee et al. |
| 2015/0261452 | A1* | 9/2015 | Moon ................ G06F 12/0246 711/103 |
| 2016/0211003 | A1 | 7/2016 | Chen et al. |
| 2017/0285949 | A1 | 10/2017 | Trika et al. |
| 2017/0285968 | A1 | 10/2017 | Jung et al. |
| 2018/0267720 | A1* | 9/2018 | Goldberg ............. G06F 3/0679 |
| 2018/0270499 | A1 | 9/2018 | Symes |
| 2018/0295367 | A1 | 10/2018 | Mohhamed et al. |
| 2018/0341410 | A1 | 11/2018 | Benisty |
| 2018/0357074 | A1 | 12/2018 | Sharoni |
| 2019/0043201 | A1* | 2/2019 | Strong ............... G06K 9/00624 |
| 2019/0079677 | A1 | 3/2019 | Malladi et al. |
| 2019/0163622 | A1 | 5/2019 | Wu et al. |
| 2019/0187936 | A1 | 6/2019 | Naing et al. |
| 2019/0294730 | A1 | 9/2019 | Jenkins et al. |
| 2019/0313083 | A1 | 10/2019 | Chavez |
| 2019/0379926 | A1 | 12/2019 | Vari |
| 2020/0145701 | A1 | 5/2020 | Liu |
| 2021/0149946 | A1 | 5/2021 | VanBlon |
| 2021/0385532 | A1 | 12/2021 | Michiels |

FOREIGN PATENT DOCUMENTS

| | | |
|---|---|---|
| KR | 10-2018-0015101 A | 10/2018 |
| KR | 10-2018-0114972 A | 10/2018 |
| WO | WO 2017/134110 A1 | 8/2017 |

OTHER PUBLICATIONS

U.S. Appl. No. 15/929,090, filed Jan. 11, 2019.
U.S. Appl. No. 16/708,091, filed Dec. 9, 2019, entitled Storage System and Method for Optimized Surveillance Search.
U.S. Appl. No. 16/781,717, filed Feb. 4, 2020, entitled "Storage System and Method for Optimized Surveillance Search."
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4_AVC on Aug. 6, 2019; 18 pages.
"Video compression picture types"; Wikipedia entry; downloaded from the Internet at https://en.wikipedia.org/wiki/Video_compression_picture_types on Aug. 6, 2019; 4 pages.
International Search Report dated Aug. 26, 2020 for International Application No. PCT/US2020/024852.
Written Opinion dated Aug. 26, 2020 for International Application No. PCT/US2020/024852.
International Search Report dated Aug. 5, 2020 for International Application No. PCT/US2020/037897.
Written Opinion dated Aug. 5, 2020 for International Application No. PCT/US2020/037897.
Non-final Office Action dated Aug. 12, 2021 for U.S. Appl. No. 16/818,452.
Final Office Action dated Jul. 13, 2021 for U.S. Appl. No. 16/899,262.
International Search Report dated Jul. 6, 2021 for International Application No. PCT/US2020/037903.
Written Opinion dated Jul. 6, 2021 for International Application No. PCT/US2020/037903.
Non-final Office Action dated Mar. 28, 2022 for U.S. Appl. No. 16/781,717.

\* cited by examiner

STORAGE SYSTEM AND METHOD FOR AUTOMATIC DATA PHASING

BACKGROUND

In data analysis applications, most of the data is stored in a storage system for a given amount of time. Post analysis, the data is thrashed, leaving only a few selected sections. The onus is usually on the host to delete the data, so the host needs to track data movement and logical addresses in the memory of the storage system. The host has logic to clean up the storage space and typically simply overwrites the logical data, thereby automatically deleting the previous version of the data. The storage system typically has no information about the content of the data and performs garbage collection on the data as it would with any other stored data. In some other cases, the host may send an erase command to logically erase the data, but, by that time, the storage system may have already performed garbage collection and moved the data.

DETAILED DESCRIPTION

Overview

By way of introduction, the below embodiments relate to a storage system and method for automatic data phasing. In one embodiment, a storage system is provided comprising a memory and a controller. The controller is configured to receive, from a host, data to be written in the memory and an indication of an expected lifespan of the data; and determine whether to perform a garbage collection operation on the data based on the expected lifespan of the data.

In some embodiments, the controller is further configured to invalidate the data in a logical-to-physical address table after the expected lifespan of the data has elapsed even though the data is otherwise valid.

In some embodiments, invalidating the data in the logical-to-physical address table even though the data is otherwise valid indicates that the expected lifespan of the data has elapsed and causes the controller to forego performing garbage collection on the data.

In some embodiments, the controller is further configured to store the indication in an entry in the logical-to-physical address table associated with the data.

In some embodiments, the controller is further configured to inform the host that the data has been invalidated.

In some embodiments, the controller is further configured to forego performing the garbage collection operation on the data even though the expected lifespan of the data has not elapsed.

In some embodiments, the controller is further configured to receive an indication of an updated expected lifespan of the data from the host.

In some embodiments, the controller is further configured to determine how the data should be stored based on the expected lifespan of the data.

In some embodiments, the controller is further configured to determine how the data should be stored by choosing one or more of the following: a data protection method, an endurance parameter, a trim parameter, and a region of the memory to store the data.

In some embodiments, the memory comprises a three-dimensional memory.

In some embodiments, the storage system is configured to be integrated in the host.

In some embodiments, the storage system is configured to be removably connected with the host.

In another embodiment, a method is provided that is performed in a storage system comprising a memory. The method comprises receiving, from a host, data to be written in the memory, the data having an indicated lifetime; after the lifetime of the data has expired, invalidating the data in a logical-to-physical address table even though the data is otherwise valid; and performing garbage collection on valid data in the logical-to-physical address table, wherein invalidating the data in the logical-to-physical address table even though the data is otherwise valid causes the data to avoid garbage collection.

In some embodiments, the method further comprises informing the host that the data has been invalidated.

In some embodiments, the method further comprises receiving, from the host, an updated lifetime of the data.

In some embodiments, the indication comprises a tag in a write command, and the method further comprises storing the tag in an entry associated with the data in the logical-to-physical address table.

In another embodiment, a storage system is provided comprising a memory; means for receiving data to be written in the memory and an indication of a lifetime of the data; and means for foregoing garbage collection on the data in response to the lifetime of the data expiring.

In some embodiments, the storage system further comprises means for after the lifetime of the data has expired, invalidating the data in a logical-to-physical address table even though the data is otherwise valid.

In some embodiments, the storage system further comprises means for informing the host that the data has been invalidated.

In some embodiments, the storage system further comprises means for receiving a new indication of a different lifetime of the data.

Other embodiments are possible, and each of the embodiments can be used alone or together in combination. Accordingly, various embodiments will now be described with reference to the attached drawings.

EMBODIMENTS

Figures 1A, 1B:
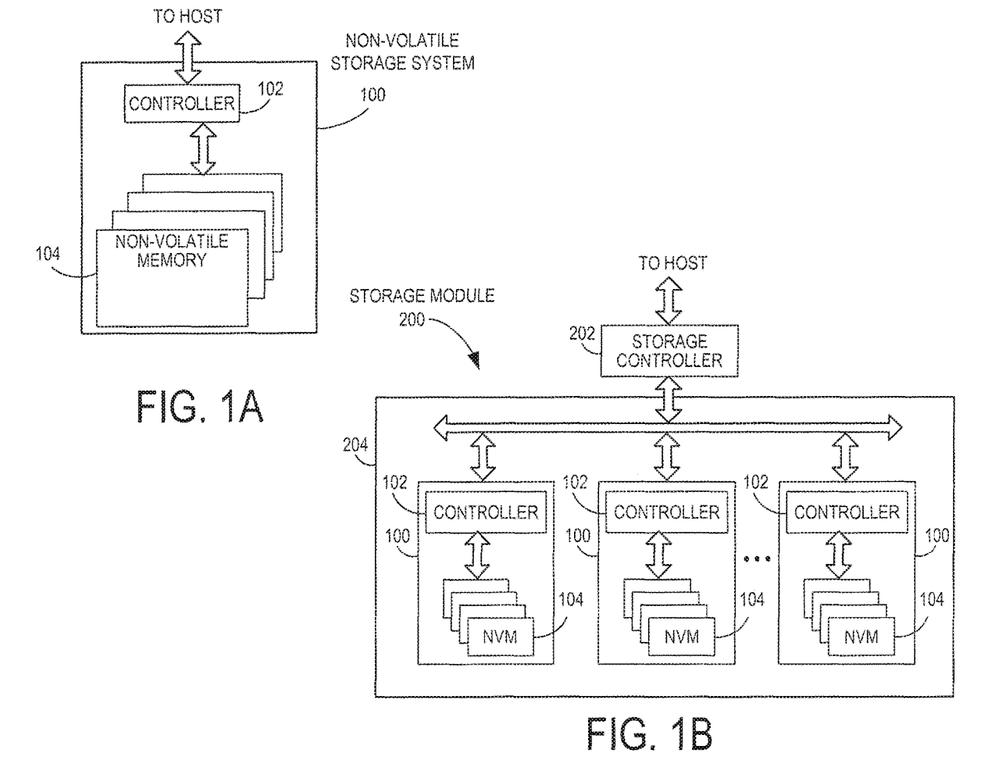
FIG. 1A is a block diagram of a non-volatile storage system of an embodiment.
FIG. 1B is a block diagram illustrating a storage module of an embodiment.
Figure 1C:
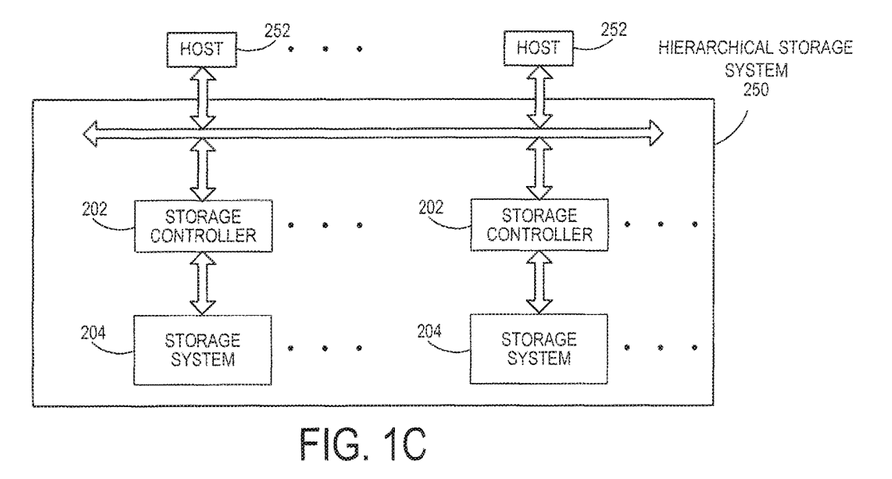
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
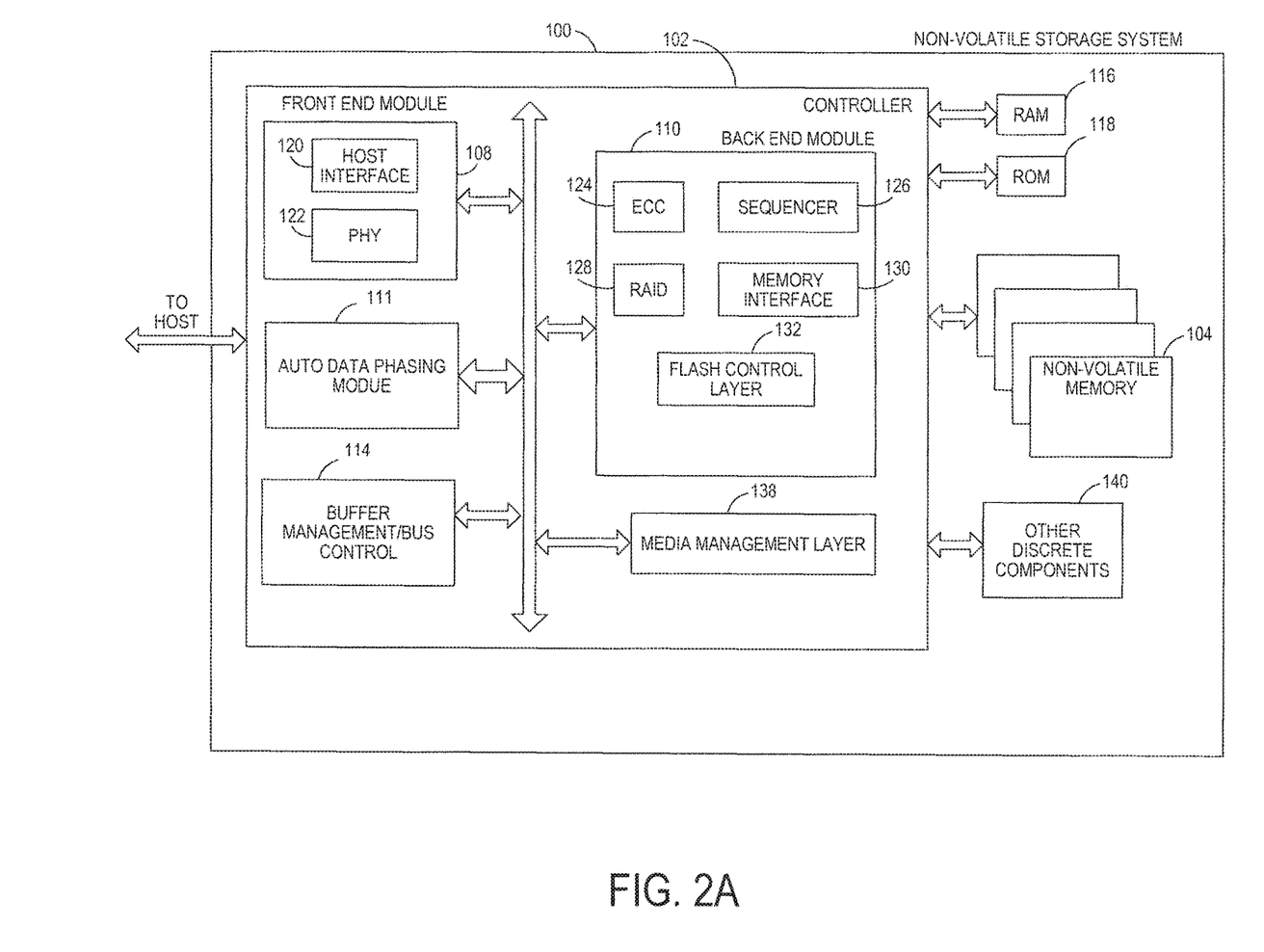
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include an auto data phasing module 111, which is discussed in more detail below, and can be implemented in hardware or software/firmware. The auto data phasing module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
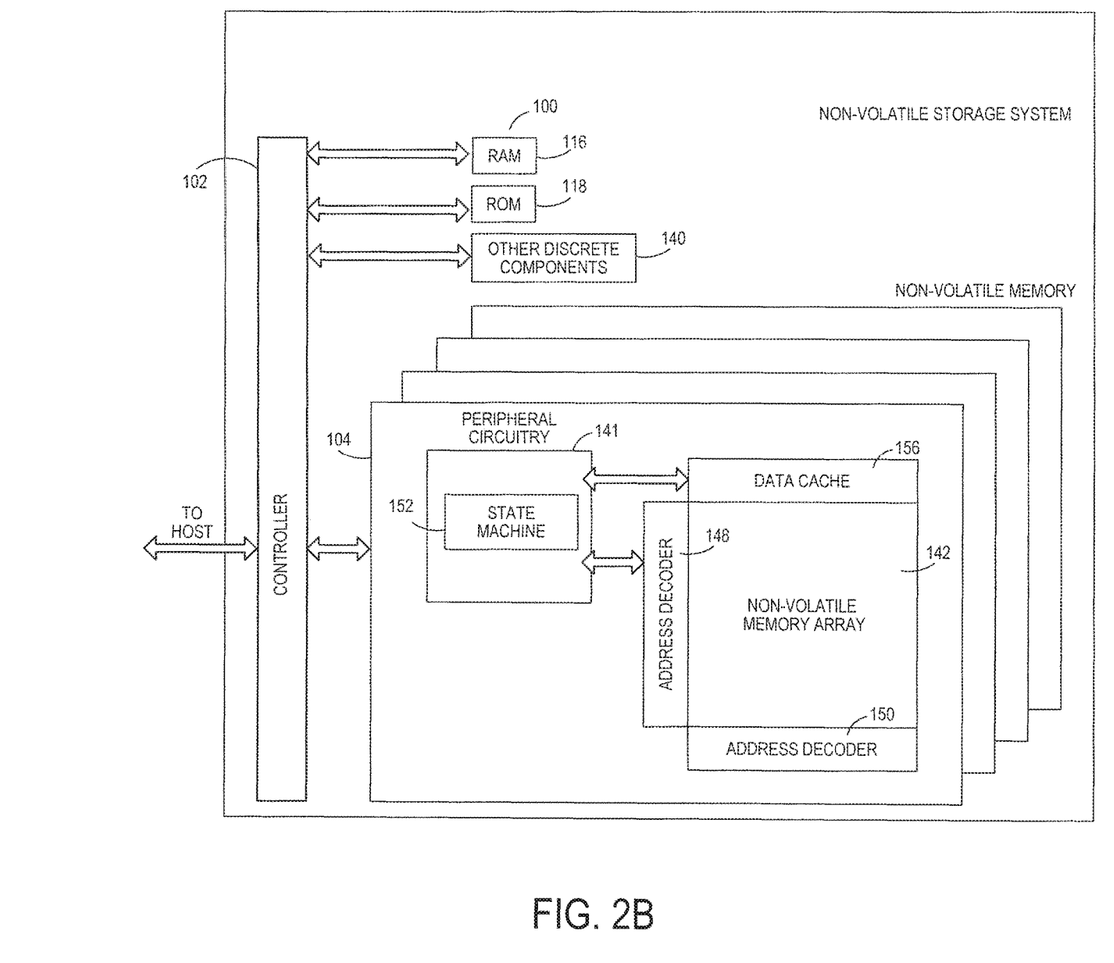
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, in data analysis applications, most of the data is stored in a storage system for a given amount of time. Post analysis, the data is thrashed, leaving only a few selected sections. The onus is usually on the host to delete the data, so it needs to track data movement and logical addresses in the memory of the storage system. The host has logic to clean up the storage space and typically simply overwrites the logical data, thereby automatically deleting the previous version of the data. The storage system typically has no information about the content of the data and performs garbage collection on the data as it would with any other stored data. In some other cases, the host may send an erase command to logically erase the data, but, by that time, the storage system may have already performed garbage collection and moved the data (e.g., to a "cold" section of memory).

The following embodiments can be used to help increase system performance and endurance of the storage system and to help minimize host effort to manage data in the storage system. In particular, these embodiments allow the storage system 100 to perform an internal "auto phasing" operation to automatically delete data after an elapsed period of time. In one embodiment, the storage system 100 receives a write command from a host. The write command comprises data to be written in the memory 104 and an indication of an expected lifespan of the data. For example, the host can tag the write command with the expected lifespan of data during command submission. Alternatively, the indication of the expected lifespan can be sent at a different time and not be part of the write command. The host can tag data based on the application requirement. The indication/tag/metadata of expected lifespan of the data can be noted in any suitable form, such as, but not limited to, absolute time, elapsed time, amount of elapsed data writes or elapsed commands, or percentage of memory fullness. Of course, these are merely examples, and other types of indication can be used.

The storage system 100 (e.g., the controller 102 or the auto data phasing module 111) can use the indication of data lifetime to determine whether or not to perform garbage collection on the data. For example, the indication of data lifetime allows the storage system 100 to auto phase and optimize its bandwidth for garbage collection by only foregoing to perform garbage collection on data or blocks of data that are no longer "alive" or that do not have much life left (i.e., if the data will be invalidated automatically within a threshold amount of time from its expected lifetime). In this way, the portion of the host's responsibility is shifted to the storage system 100, which benefits both the host and the storage system 100. That is, the host tells the storage system 100 when to get rid of data, and the storage system 100 handles the rest. In this way, the storage system 100 can be considered a "self-cleaning" system in that it knows what data is going to stay for how long and makes storage decisions accordingly. The usage of the host file system can have an impact, as the storage system 100 or host may have to take responsibility to keep the file system on par with eliminated data without host intervention.

The storage system 100 can determine that the data has exceeded its indicated lifespan using any suitable mechanism. For example, in one embodiment, the storage system 100 can access absolute time through the host 50, a network, or through any other mechanism. The controller 102 can be configured with hardware and/or software to compare the tagged lifetime of the data to the current time to determine if the data has elapsed. In some situations, the controller 102 can obtain time during a power on sequence and subsequently trigger its own clock. In other situations, the controller 102 can make use of relative time stamps from a Program Clock Reference (PCR) of a Moving Picture Experts Group (MPEG) transport stream during a post-initialization time snapshot of the data, if that format is used.

As mentioned above, one of these storage decisions is whether or not to perform garbage collection. However, other storage decisions can be implicated, such as, but not limited to, a data protection method, an endurance parameter, a trim parameter, and a region of the memory to store the data. So, for example, the storage system 100 can choose the appropriate endurance block for the data according to the lifespan of the data.

Turning now to the garbage collection aspect, the storage system 100 can use any suitable technique for foregoing garbage collection on data in response to the lifetime of the data expiring. For example, the controller 102 can store the data lifetime tag received from the host in a logical-to-physical (L2P) address table entry associated with the data. (Alternatively, the controller 102 can store the lifespan metadata in the header of the logical data.) That way, the controller 102 can repeatedly check the logical-to-physical address table for any tag that indicates expired data and invalid the data in the table even though the data is otherwise valid. For example, time can be maintained in this table along with the logical counterpart. This will enable the controller 102 to know what sections of the data have elapsed in how much time for a given block.

Since the controller 102 only performs garbage collection on valid data in the table, invalidating the data in the table cause the controller 102 to skip performing garbage collection on the data. That is, by storing and managing the lifespan metadata in the logical-to-physical address table, the storage system 100 relieves time-elapsed fragments from garbage collection by parsing the table for tagged lifespan. In operation, during garbage collection, the absolute time is compared against the time tagged at the time of write. Source blocks are evaluated from its table control structure for data which has already time elapsed (by determining what data is marked as invalid). In this way, multiple blocks would compete among themselves for priority when a source block for garbage collection needs to be picked. Further, by using tagged lifespan metadata as a trigger to logically delete data, expensive data movement is avoided.

The advantage of marking data as invalid prior to performing garbage collection is that the controller 102 is enabled to move only those data fragments that are still alive. Also, system thresholds can be defined to prioritize and perform garbage collection on those blocks having data whose remaining lifespan is greater than the lifespan of data in other blocks. Thus, the value addition through garbage collection is increased. Further, the controller 102 may not want to prioritize a block for garbage collection whose lifespan, according to the tagged metadata, is just about to expire, as the whole effort may go in vain.

In some embodiments, the host can provide an updated indication of the data's lifetime (e.g., to shorten or lengthen the originally-indicated lifetime of the data). In this way, the host can inform the storage system 100 to stop or postpone self-phasing of some portion of data.

These embodiments can be used in any suitable environment. For example, these embodiments can be used in conjunction with a data analysis application that may only need data for a known amount of time after which it may want to thrash it. Different data coming in from different sensors might be required to be stored in storage system 100 for different amounts of time, and the host may selectively move important/selective portions of data to some other regions or device. As another example, these embodiments can be used in a multi-channel video capture system, such as with Internet of Things (IoT) or surveillance devices. In such cases, stored content may be required to be kept for many years to support investigations or analysis long after recording. But there may also be jurisdictional and regulatory compliance issues that may require content to be removed from the storage system 100 after a relatively-short period of time. Very often, the expiry time is fixed and different as prescribed by local laws, and the entire data is thrashed but for the required clips. These embodiments can be leveraged in these use cases to optimize the system as a whole, as the host is relieved of some of its overhead to manage data.

Figure 3:
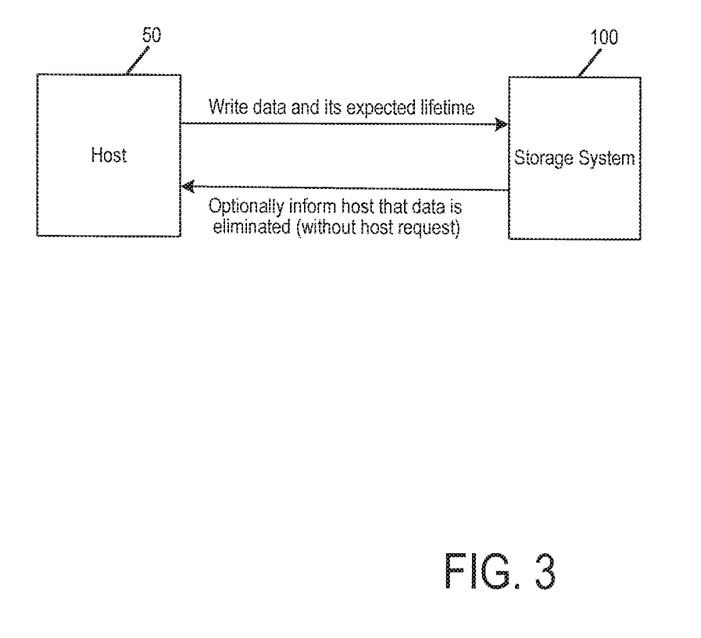
FIG. 3 is a block diagram of a host and storage system of an embodiment.

The embodiments can be implemented in any suitable way. FIG. 3 is a block diagram of one suitable implementation. As shown in FIG. 3, the host 50 sends data and its expected lifetime to the storage system 100. In response, the storage system 100 manages data as per its lifetime, such as protection, endurance, and other memory features. The storage system 100 also stores different data separately as per their expected lifetimes for easier management. Further, the lifetime of the data is tagged to the logical data, such as in a logical-to-physical (L2P) address table and used to optimize storage garbage collection. Optionally, the storage system 100 can tell the host 50 that data has been eliminated (without a request from the host 50). The host 50, in some cases, may make a backup of the data if it determines mid-way that it suggested an initial smaller life to the data than desired. More details about the operation of the host 50 and storage system 100 in this regard are shown in the flowchart 400 in FIG. 4.

Figure 4:
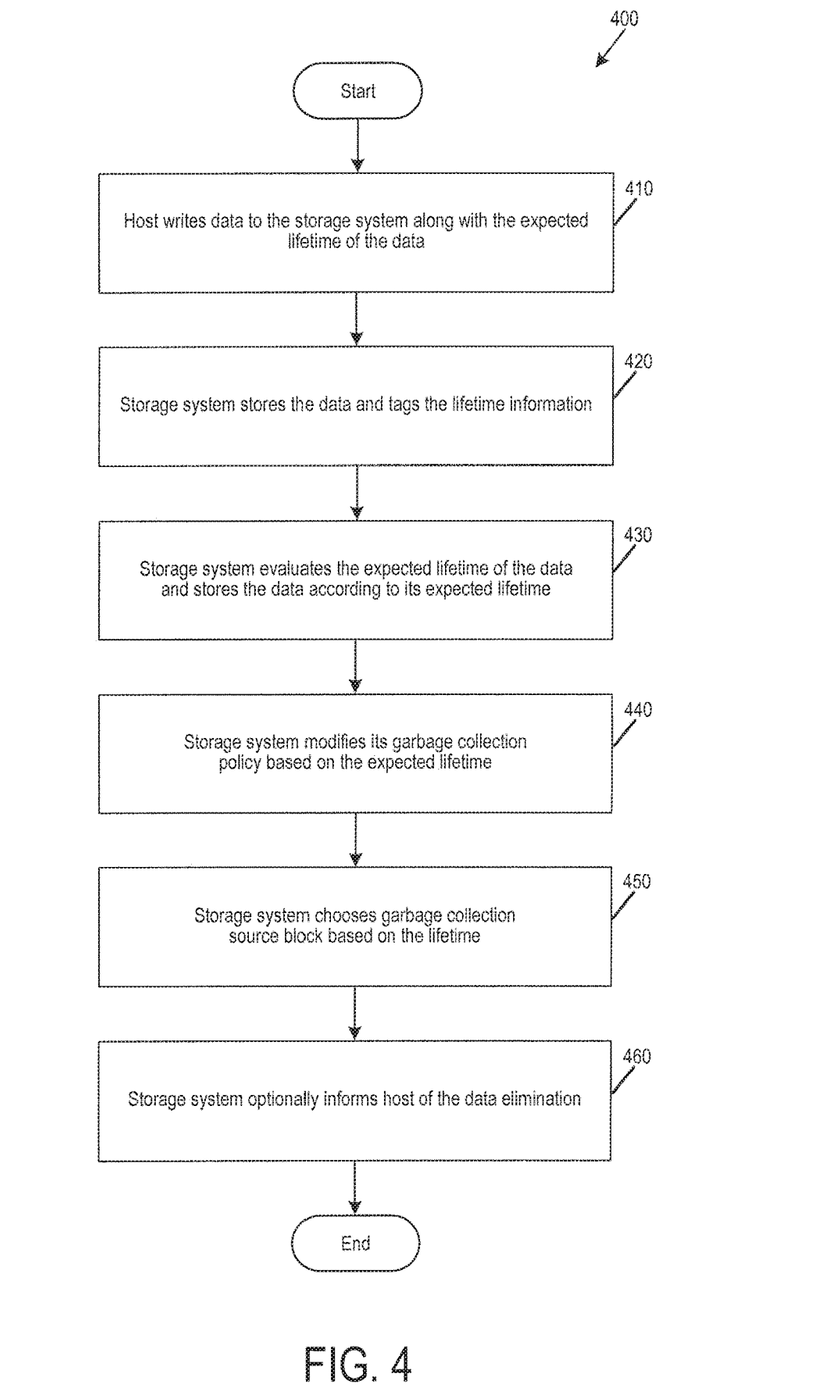
FIG. 4 is a flow chart of a method of an embodiment for auto data phasing.

As shown in FIG. 4, the host 50 first writes data to the storage system 100 along with the expected lifetime of the data (act 410). The expectancy can take any form, such as, but not limited to, time, number of commands, and amount of data. The storage system 100 stores the data and tags the lifetime information to one of the corresponding mapping tables, such as the logical-to-physical (L2P) address table, which is typically managed for logical data (act 420). Next, the storage controller 102 evaluates the expected lifetime of the data and stores the data (act 430). The controller 102 can change the protection, endurance, NAND trim, and other parameters to distinguish the data based on its expected lifetime. Then, the storage system 100 modifies its garbage collection policy (act 440). For example, the storage system 100 can eliminate the data internally (without host intervention) if it determines the data has elapsed and, hence, avoids data movement with only updates to the L2P table.

The storage system 100 then chooses a garbage collection source block based on the data's lifetime (act 450). That is, the storage system 100 may prefer to perform garbage collection on data that is expected to live longer than other data. It specifically may avoid picking a block having data that may expire shortly. Finally, the storage system 100 optionally informs the host 50 of data elimination, so the storage system 100 and host 50 are on the same page regarding the data (act 460). In some cases, the host 50 can increase or decrease the stated lifespan of other data.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
      receive, from a host, a first write command comprising first data to be written in the memory, a first logical address, and an expiration time of the first data;
      store the expiration time of the first data in a first entry in a logical-to-physical address map that associates the first logical address with a first physical address in the memory that stores the first data;
      receive, from the host, a second write command comprising second data to be written in the memory, a second logical address, and an expiration time of the second data;
      store the expiration time of the second data in a second entry in the logical-to-physical address map that associates the second logical address with a second physical address in the memory that stores the second data; and
      prior to performing a garbage collection operation:
         determine that the first data has expired by determining that a current time is later than the expiration time of the first data and, in response, invalidate the first entry in the logical-to-physical address map while maintaining the first data in the memory, wherein invalidating the first entry in the logical-to-physical address map causes the controller to forgo performing the garbage collection operation on the first data, and
         determine that the second data has not expired by determining that the current time is earlier than the expiration time of the second data and, in response, perform the garbage collection operation on the second data.

2. The storage system of claim 1, wherein the controller is further configured to inform the host that the first data has been invalidated.

3. The storage system of claim 1, wherein the controller is further configured to forgo performing a garbage collection operation on other data even though the other data has not expired expected.

4. The storage system of claim 1, wherein the controller is further configured to receive an update to the expiration time of the first data.

5. The storage system of claim 1, wherein the memory comprises a three-dimensional memory.

6. The storage system of claim 1, wherein the storage system is configured to be integrated in the host.

7. The storage system of claim 1, wherein the storage system is configured to be removably connected with the host.

8. The storage system of claim 1, wherein providing the expiration time of the first data avoids a need of the host to erase the first data.

9. The storage system of claim 1, wherein the controller is further configured to determine how the first data should be stored based on the expiration time of the first data.

10. The storage system of claim 9, wherein the controller is further configured to determine how the first data should be stored by choosing a data protection method to store the first data.

11. The storage system of claim 9, wherein the controller is further configured to determine how the first data should be stored by choosing an endurance parameter to store the first data.

12. The storage system of claim 9, wherein the controller is further configured to determine how the first data should be stored by choosing a trim parameter to store the first data.

13. The storage system of claim 9, wherein the controller is further configured to determine how the first data should be stored by choosing a region of the memory to store the first data.

14. A method comprising:
    performing the following in a storage system comprising a memory:
       receiving, from a host, a first write command comprising first data to be written in the memory, a first logical address and an expiration time of the first data;
       storing the expiration time of the first data in a first entry in a logical-to-physical address map that associates the first logical address with a first physical address in the memory that stores the first data;
       receiving, from the host, a second write command comprising second data to be written in the memory, a second logical address, and an expiration time of the second data;
       storing the expiration time of the second data in a second entry in the logical-to-physical address map that associates the second logical address with a second physical address in the memory that stores the second data; and
       prior to performing a garbage collection operation:
          determining that the first data has expired by determining that a current time is later than the expiration time of the first data and, in response, invalidating the first entry in the logical-to-physical address map while maintaining the first data in the memory, wherein invalidating the first entry in the logical-to-physical address map causes the controller to forgo performing; the garbage collection operation on the first data, and
          determining that the second data has not expired by determining that the current time is earlier than the expiration time of the second data and, in response, performing the garbage collection operation on the second data.

15. The method of claim 14, further comprising informing the host that the first data has been invalidated.

16. The method of claim 14, further comprising receiving, from the host, an update to the expiration time of the first data updated lifetime of the data.

17. The method of claim 14, wherein providing the expiration time of the first data avoids a need of the host to erase the first data.

18. The method of claim 14, further comprising determining how the first data should be stored based on the expiration time of the first data.

19. A storage system comprising:
a memory;
means for receiving, from a host, a first write command comprising first data to be written in the memory, a first logical address, and an expiration time of the first data;
means for storing the expiration time of the first data in a first entry in a logical-to-physical address map that associates the first logical address with a first physical address in the memory that stores the first data;
means for receiving, from the host, a second write command comprising second data to be written in the memory, a second logical address, and an expiration time of the second data;
means for storing the expiration time of the second data in a second entry in the logical-to-physical address map that associates the second logical address with a second physical address in the memory that stores the second data; and
means for performing the following prior to performing a garbage collection operation:
determining that the first data has expired by determining that a current time is later than the expiration time of the first data and, in response, invalidating the first entry in the logical-to-physical address map while maintaining the first data in the memory, wherein invalidating the first entry in the logical-to-physical address map causes the controller to forgo performing the garbage collection operation on the first data, and
determining that the second data has not expired by determining that the current time is earlier than the expiration time of the second data and, in response, performing the garbage collection operation on the second data.

20. The storage system of claim 19, wherein providing the expiration time of the first data avoids a need of a host to erase the first data.

* * * * *